United States Patent
Turner (10) Patent No.: US 7,192,195 B2
(45) Date of Patent: Mar. 20, 2007

(54) METHODS AND APPARATUS FOR ESTIMATING OPTICAL INSERTION LOSS

(75) Inventor: C. Mark Turner, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/193,931

(22) Filed: Jul. 29, 2005

(65) Prior Publication Data

US 2007/0025681 A1    Feb. 1, 2007

(51) Int. Cl.
*G02B 6/38* (2006.01)
(52) U.S. Cl. .......................... 385/55; 385/97; 356/73.1
(58) Field of Classification Search ................. 385/53, 385/12, 55, 97, 95; 356/73.1, 215–216, 213
See application file for complete search history.

(56) References Cited

U.S. PATENT DOCUMENTS

| | | | | |
|---|---|---|---|---|
| 4,360,268 A | * | 11/1982 | Zucker et al. ............. | 356/73.1 |
| 4,708,476 A | * | 11/1987 | So et al. .................... | 356/73.1 |
| 5,259,047 A | * | 11/1993 | Morrison et al. ............. | 385/27 |
| 6,369,883 B1 | * | 4/2002 | Clark .......................... | 356/73.1 |
| 6,816,661 B1 | | 11/2004 | Barnes et al. ............... | 385/134 |
| 2005/0036744 A1 | | 2/2005 | Caveney et al. | |

* cited by examiner

*Primary Examiner*—Hemang Sanghavi
(74) *Attorney, Agent, or Firm*—Jeffrey S. Bernard (57) ABSTRACT

A method for estimating insertion loss at a mechanical joining point between adjoining optical fibers includes introducing light energy into an optical fiber, using light collecting means to collect the light energy emanating from the optical fiber proximate the mechanical joining point, measuring a reference optical power prior to joining the optical fibers, measuring a terminated optical power after the optical fibers are joined, and comparing the terminated optical power to the reference optical power. An apparatus for estimating insertion loss includes a source of light for introducing light energy into an optical fiber, at least one optical fiber strand disposed about the mechanical joining point for collecting the light energy emanating from the optical fiber proximate the mechanical joining point, and an optical power meter coupled to the at least one optical fiber strand for measuring the optical power of the light energy emanating from the mechanical joining point.

13 Claims, 5 Drawing Sheets

METHODS AND APPARATUS FOR ESTIMATING OPTICAL INSERTION LOSS

BACKGROUND OF THE INVENTION

1. Field of the Invention

The present invention relates generally to estimating optical insertion loss, and more particularly, to methods and apparatus for estimating insertion loss at a mechanical joining point between optical fibers.

2. Technical Background

Insertion loss at fiber joining points within an optical network should be determined to be within acceptable limits in order to verify proper physical contact between adjoining optical fibers and to maintain the system loss budget. Currently, one specified way of determining insertion loss is with the use of a hand-held optical loss test set, which measures the insertion loss through a length of optical fiber that may include one or more joining points between adjoining optical fibers. For example, a typical insertion loss measurement involves evaluating a length of optical fiber having a mated connector pair at each end of the optical fiber link being tested. However, the condition of the test jumpers and the test equipment referencing procedure (if implemented improperly) can negatively influence the accuracy of the measurement. As a result, a connector is sometimes needlessly replaced due to measurement error although the actual insertion loss over the optical fiber link is within acceptable limits. A means to readily, accurately and cost effectively estimate the insertion loss at a fiber joining point during the installation and termination process would greatly increase terminated fiber yield rates and reduce connector scrap rates.

Another conventional method of determining optical power loss when two adjoining optical fibers are mechanically joined is accomplished using an "Optical Time Domain Reflectometer" (OTDR). An OTDR system provides an approximation of the insertion loss (i.e., backscattered optical power as a function of time) by introducing pulses of laser light into one end of an arbitrarily long optical fiber, and then detecting the amount of light that returns. The OTDR continuously measures reflected power as a function of time to display the distance to an optical discontinuity (e.g., mated connector pair; mechanical splice; fiber break; etc.). If an abrupt index of refraction change occurs at the location of the discontinuity, a relatively large amount of optical power will saturate a photodetector for a finite period of time. In order to approximate this type of optical power loss as a function of time, high-speed sampling is required. The recovery time of the OTDR as the sampling and abrupt optical power reception occurs influences how well a particular discontinuity can be uniquely resolved and measured within the level of skill of the operator. For example, an OTDR can be used to determine how well an optical fiber has been terminated, but the approximated optical power loss depends upon the type of measurement method used (e.g., two-point; LSA; etc.) and typically also includes the optical power loss through a length of optical fiber on either side of the fiber joining point in addition to the decrease in optical power due to the mechanical coupling of the adjoining optical fibers. As such, the optical power loss approximation at a fiber joining point obtained using an OTDR is not recognized by industry standards as a direct measurement to determine the condition of the fiber joining point (e.g., termination).

Another method of subjectively estimating insertion loss and determining when adjoining optical fibers have been brought into proper physical contact utilizes a "visual fault locator" (VFL) system. In a typical VFL system, an optical power generator, such as a visible light laser, is used to launch light energy into one of the optical fibers and thereby cause the mechanical joining point to glow. A particular apparatus and method referred to as the "Continuity Test System" (CTS) has been developed by Corning Cable Systems of Hickory, N.C. and is described in greater detail in U.S. Pat. No. 6,816,661. In practice, the primary shortcoming of the CTS method is that the variability in the level of glow, both before and after the termination, creates difficulty in determining the amount of change in the level of glow that is acceptable and indicates a proper termination. Contributing factors include variations in ambient light as well as the operator's subjective interpretation of the change in the level of glow before the optical fibers are joined (reference) glow and after the optical fibers have been joined (terminated) glow. Even after the optical fibers have been successfully joined and an acceptable termination has been made, the splice point may continue to glow slightly, which is referred to in the art as a "nuisance glow." Oftentimes, an operator will attempt multiple connector terminations or fiber insertions in the same connector/splice in an effort to completely eliminate the nuisance glow. These repeated termination and insertion efforts can result in connector damage and/or optical performance that is less than that which would have been achieved had the operator accepted the first termination, even if the glow was not completely diminished and the nuisance glow persisted.

In view of the shortcomings of the current methods for evaluating insertion loss, improved methods and apparatus are needed for estimating the optical insertion loss at a mechanical joining point between optical fibers. Such methods and apparatus require that optical power be collected and measured at the mechanical joining point of interest under the same conditions during an initial reference measurement and a subsequent insertion loss measurement. Accordingly, the precision of the estimate of optical insertion loss provided by these methods and apparatus, as compared to the optical insertion loss the fiber joining point actually contributes to the total insertion loss, should be limited only by the optical power detection, collection and measurement capabilities of the associated test equipment.

SUMMARY OF THE INVENTION

In one aspect, the present invention provides a method and apparatus for estimating insertion loss at a mechanical joining point between optical fibers, such as, but not limited to, a mechanical splice, a mechanical termination using a field-installable connector, or a pair of mated optical connectors. The method and apparatus includes utilizing a "visual fault locator" (VFL) or other light source to launch light energy into one of the optical fibers of the mechanical joining point, thereby causing a portion of the mechanical joining point to glow so that a change in optical power can be detected, collected and measured. A means for detecting and collecting the light energy is positioned about a non-opaque portion of the mechanical joining point, such as a non-opaque portion of a mechanical splice used to splice an optical fiber to an adjoining optical fiber, a non-opaque portion of a mechanical splice connector used to terminate an optical fiber to a connector, or a non-opaque portion of an optical connector used to mate an optical fiber to an opposing optical fiber. An initial reference optical power level is measured and recorded at the fiber joining point prior to joining the optical fibers (e.g., splicing the optical fibers, terminating the optical fiber into the mechanical splice connector, mating the optical fiber to another connectorized optical fiber). The optical fiber is joined, and a final optical power level is measured and recorded. The final optical power level is then compared to the reference optical power level to provide an estimate of the insertion loss at the mechanical joining point between the optical fibers.

In another aspect, the present invention provides a method for estimating the insertion loss of an optical fiber terminated to a field-installable mechanical splice connector by measuring light emanating from the mechanical joining point. The method includes utilizing a "visual fault locator" (VFL) or other light source to launch light energy into the stub fiber of the field-installable connector, thereby causing a non-opaque (e.g., translucent) portion of the connector to glow at the fiber joining point. A means for detecting and collecting the light energy is positioned about the non-opaque portion of the field-installable connector. The means for detecting and collecting may be any suitable means including, but not limited to, an array of optical fibers (e.g., large core plastic or glass optical fibers) that are coupled together into an optical power meter through a passive 1×N splitter/coupler, an opto-electronic component such as a photodetector, or an integrating sphere. As the field optical fiber approaches the stub fiber of the field-installable connector, the light energy diminishes as the light is coupled into the field optical fiber. Consequently, the glow from the non-opaque portion of the connector likewise diminishes. The light energy is detected and collected at the fiber joining point before the field optical fiber is introduced into the connector and is referred to herein as the "initial" or "reference" glow. The light energy at the fiber joining point is detected and collected once again after the field optical fiber is inserted into the field-installable connector and positioned to be terminated to the connector. The light energy not transmitted through the stub fiber into the field optical fiber, referred to herein as the "final" or "terminated" glow, is measured and compared to the reference glow measured prior to insertion of the field optical fiber into the connector. The change in the light energy is then utilized to determine a mathematical estimate of the insertion loss at the fiber joining point. A termination resulting in an insertion loss estimate less than a predetermined threshold value indicates an acceptable termination.

In yet another aspect, the present invention provides a method and apparatus for estimating the insertion loss at a mechanical joining point between optical fibers, such as a mechanical splice wherein light energy can be introduced into one or both of the optical fibers and optical power can be detected, collected and measured. The mechanical joining point includes a non-opaque portion, such as a non-opaque splice protector configured such that light energy introduced into an optical fiber produces a detectable glow that is stable and consistent. The methods and apparatus for estimating insertion loss are not limited to a mechanical splice point, but may be applied to any optical device or system in which optical fibers are spliced, mated or otherwise joined, and one of the optical fibers is capable of being energized with radiant energy from an energy source, such as an optical generator. In preferred embodiments, the ambient energy level is controlled and the detecting and collecting means consistently captures the radiant energy, such as optical, electrical, thermal, or acoustical energy, emanating from the mechanical joining point.

In yet another aspect, the present invention provides a method and apparatus for estimating the insertion loss at a mechanical joining point between a field optical fiber and a UniCam® field-installable mechanical splice connector available from Corning Cable Systems of Hickory, N.C. The UniCam® connector has unique design features that enable a rapid, accurate and cost effective estimate of the insertion loss of the field optical fiber during the termination process, but prior to crimping the lead-in tube to the tight-buffered material or tubing surrounding the field optical fiber. A means for collecting light is used to measure optical power, which in turn is used to estimate the optical insertion loss at the mechanical joining point. Each UniCam® connector is manufactured and assembled in a factory controlled environment with a highly precise and polished end face such that the optical insertion loss of the end face is held within a specified tolerance. The optical insertion loss of the connector end face is measured at the factory to ensure that the polished condition of the end face and the position of the stub optical fiber are as specified. A field insertion loss measurement is taken at the mechanical joining point between the stub optical fiber of the field-installable connector and the field optical fiber. No change should occur between the reference optical power measurement and the terminated optical power measurement other than the insertion of the prepared (e.g., cleaved, cleaned, polished) field optical fiber into the field-installable connector. The factory-determined insertion loss at the connector end face is then added to the field-determined insertion loss at the mechanical joining point to verify an acceptable termination and total connecter insertion loss. The insertion loss at the connector end face determined in the factory is utilized as part of the total insertion loss of the field-installable connector rather than relying on an insertion loss measurement conducted in the field utilizing an unsuitable test jumper (either unknown quality or one that has been measured incorrectly) mated to the UniCam® connector under less controllable test conditions.

Additional features and advantages of the invention are set forth in the detailed description which follows and will be readily apparent to those skilled in the art from that description, or will be readily recognized by practicing the invention as described in the detailed description, including the claims, and the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be merely illustrative and not limiting the intended scope of the claims in any manner.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts. A field-installable mechanical splice connector operable for terminating a field optical fiber to the connector is shown herein as an exemplary embodiment for estimating insertion loss at a mechanical joining point. However, it should be understood that the methods and apparatus of the present invention may be applied to any mechanical joining point, such as, but not limited to, any mechanical joining point between adjoining optical fibers wherein light energy can be transmitted along at least one of the optical fibers and the optical power at the mechanical joining point can be detected, collected and measured.

Figure 1:
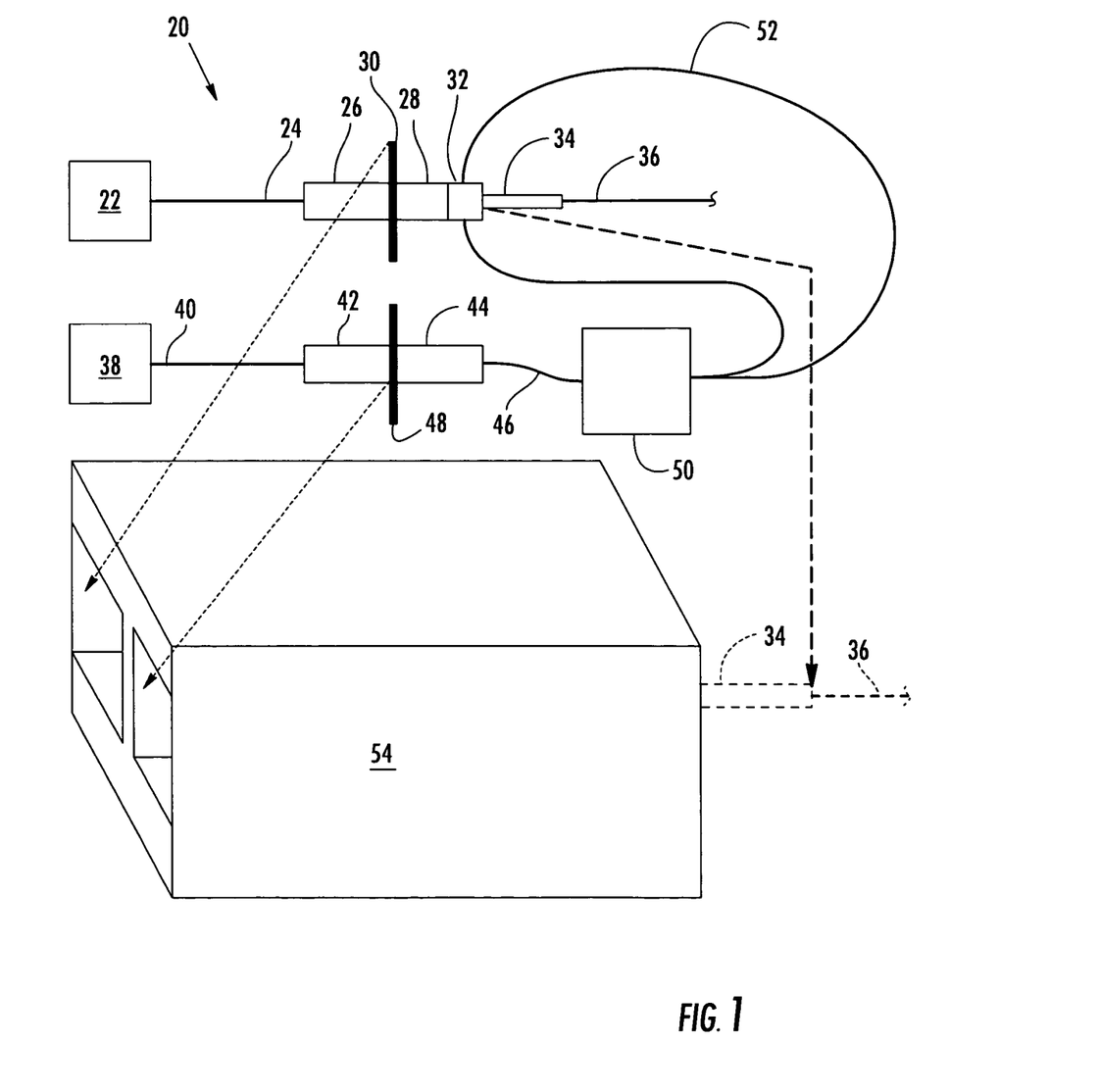
FIG. 1 is a schematic diagram illustrating an exemplary apparatus for estimating insertion loss at a mechanical joining point between adjoining optical fibers according to the present invention.

Referring to FIG. 1, the present invention provides a test apparatus 20 for estimating insertion loss at a mechanical joining point between adjoining optical fibers, such as, but not limited to, a mechanical splice, a termination using a field-installable mechanical splice connector, a pair of mating optical connectors or the mechanical joining of any two optical fibers. The apparatus 20 includes a radiant energy source 22, such as a "visual fault locator" (VFL) or other light source, to launch light energy into at least one of the adjoining optical fibers of the mechanical joining point, thereby causing a portion of the mechanical joining point to glow so that optical power at the mechanical joining point can be detected and collected, and measured. The energy source 22 generates a light signal, (e.g., a diode laser), that is transmitted through a short test jumper 24 that is factory-terminated with a polished connector 26. The other end of the jumper 24 is optically coupled to the light source 22, while the connectorized end is mated to the polished end face of an optical connector 28, such as a field-installable mechanical splice connector, via a suitable test adapter 30. In a particular embodiment, the connector 28 is a UniCam® field-installable connector of the type available from Corning Cable Systems of Hickory, N.C. As will be described in more detail below, the UniCam® connector includes a cam mechanism 32 and lead-in tube 34 for securing the field optical fiber 36 within the connector 28 and for guiding the field optical fiber 36 into the connector 28, respectively. Light energy is introduced into the field-installable connector 28 through the polished end face of the connector 28. While the light energy from a VFL is typically visible wavelength light, the energy source 22 may produce light energy having any wavelength, including invisible wavelength light, because the light energy propagates from the energy source 22 to the optical power meter 38 through the apparatus 20, in contrast to conventional VFL systems that rely on visible wavelength light being observed by an operator.

The apparatus 20 further includes an optical power meter 38 operable for quantifying optical power collected from the mechanical joining point and displaying the absolute and/or referenced optical power levels used for the estimated insertion loss. In other words, the optical power meter 38 measures a sample of light energy collected from a discrete area of the connector 28. The optical power meter 38 may include a series of LEDs, a needle, a bar graph or any other indicator capable of displaying the optical power and/or the estimated insertion loss. In addition, the meter 38 may provide a visible or audible instruction indicating whether the termination of the optical fibers at the mechanical joining point is acceptable or unacceptable. For example, a rapid and accurate method for estimating the total insertion loss of a field-installable mechanical splice connector may include obtaining a reference reading, inserting the prepared field optical fiber, obtaining a relative (i.e., terminated) insertion loss reading, retrieving a stored mated connector pair insertion loss at the end face of the field-installable connector (i.e., value determined at the factory), combining the stored mated connector pair insertion loss with the mechanical joining point insertion loss obtained from the field and displaying the total field-installed insertion loss (i.e., factory measurement plus field measurement).

A test jumper (typically short length) 40 that is factory-terminated with a precision polished optical connector 42 is coupled at one end to the optical power meter 38 and at the connector 42 is coupled to a polished end face of an optical connector 44 in communication with a coupler leg 46. The connectors 42, 44 are attached via a suitable test adapter 48, preferably of the same type as the test adapter 30. At the other end, the coupler leg 46 is in communication with a conventional optical coupler 50 (optical splitter) operable for combining light energy via one or more optical fiber strands 52 that collect a portion of the light emanating from a portion of the field-installable connector 28. In the case of a UniCam® connector, the fiber strands 52 collect a portion of the light ("glowing" or not glowing) emanating from the cam mechanism 32 portion of the connector 28. In the embodiments shown and described herein, the light energy is a visible wavelength, but may also be an invisible wavelength with departing from the scope of the invention.

For purposes of clarity, the optical coupler 50, the terminated coupler leg 46, the field-installable connector 28, the fiber strands 52 and the test adapters 30, 48 are depicted in FIG. 1 outside of an opaque cover 54. In operation, however, most or all of these components would be at least partially concealed by the cover 54 in order to isolate the components from the ambient light, and thereby control the ambient conditions during measurements. In particular, the connector 28 and the fiber strands 52 are positioned beneath the cover 54 in order to control the amount of ambient light at the mechanical joining point before (reference level) and after the termination The amount of ambient light around the connector 28 at the mechanical joining point is controlled by covering the area with the opaque cover 54 such that the only change from the reference measurement to the terminated measurement is due to the percentage of optical power that was coupled into the core of the field optical fiber 36.

Another aspect of the invention is that the polished connectors 26, 42, 44 and test jumpers 24, 40, 46, 52 remain in the same position and condition during the reference optical power measurement and the relative (terminated) optical power measurement, thus a control aspect of the invention is realized and the only variable during the procedure is the insertion of the field optical fiber in the case of a termination with a field-installable mechanical splice connector. In other words, the only change occurring between the reference optical power measurement and the termination optical power measurement, and therefore the only thing that will be measured, is the insertion loss at the mechanical splice point. The insertion loss at the mechanical splice point can change because the characteristics (i.e., cleave length, cleave angle and fiber position) of the field optical fiber differs with respect to the factory-determined insertion loss measurement (mechanical joining point plus the polished end face of the connector) 28.

As shown in FIG. 1, the means for collecting the light energy emanating from the mechanical splice point includes one or more fiber strands 52 positioned about a glowing portion of the field-installable connector 28. One or more such fiber strands 52 may be positioned about the mechanical joining point in any arrangement capable of efficiently collecting a sample of light emanating from the mechanical splice, such as, but not limited to, two points, four points, or any number of points preferably arranged in a circular array about the joining point. In preferred embodiments, the one or more fiber strands are large core multimode fibers, such as plastic optical fibers (POF). As shown herein, the one or more fiber strands are coupled through a passive 1×n optical coupler 50 into a single optical fiber 46, which is ultimately in optical communication with the optical power meter 38 through connectors 44, 42 and test jumper 40. Alternatively, the one or more fiber strands 52 may be coupled into a large area detector, or the detector may be positioned about the joining point and directly coupled to the optical power meter 38 through the connectors 44, 42 and test jumper 40. In further embodiments, lenses may be used to capture and focus the emanating light energy into the fiber strands 52.

Alternative embodiments of means for consistently capturing a sample of the light energy emanating from the mechanical joining point may be employed. In one alternative embodiment, an integrating sphere may be used to collect a greater portion of the light. The light collected by the integrating sphere may be focused into one or more fiber strands 52 operable for optically coupling the integrating sphere to the detector and optical power meter 38. Another means of measuring the reference optical power and the optical power subsequent to insertion of the field optical fiber may be accomplished via an opto-electronic component. For example, a photodetector in direct optical communication with the optical power meter 38 may be positioned about the mechanical joining point, thus obviating the need for an optical coupler 50 to couple the optical power from multiple fiber strands 52 into the external optical power meter 38. Regardless, in all embodiments the function of the light collecting means is to detect and/or collect the light emanating from the mechanical joining point.

Figure 2:
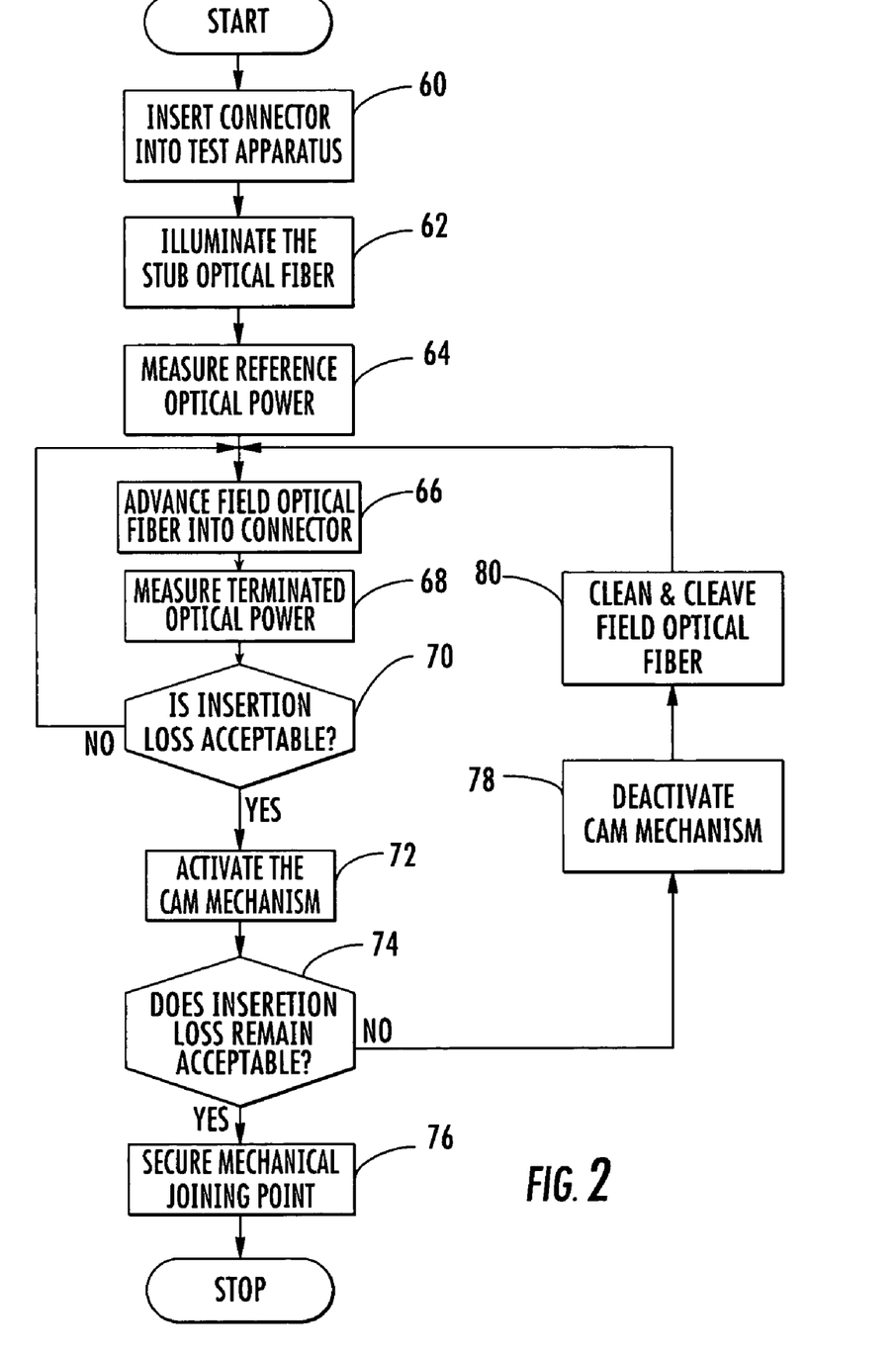
FIG. 2 is a flow chart illustrating the operations performed in an exemplary method for estimating insertion loss at a mechanical joining point between adjoining optical fibers according to the present invention.

Referring now to FIG. 2, a flow chart illustrates various operations to be performed of an exemplary method for estimating the insertion loss at a mechanical joining point between adjoining optical fibers. Prior to determining the insertion loss at the mechanical joining point, the method requires that each field-installable connector 28 is precisely cured, polished and measured for end face insertion loss at the factory. The factory measurement ensures that the polished condition of the connector end face and the position and condition of the stub optical fiber are as specified and within any applicable tolerance. As a control, this measurement is utilized as part of the field-installed insertion loss measurement rather than relying upon a measurement based on a connector of unknown quality that is mated to the field-installable connector 28 under test in the field. Two measurements are taken in the factory. The first is the normal procedure to measure the total insertion loss of the field-installable connector (i.e., the sum of both mechanical joining points with one measurement). A second measurement is taken to measure only the insertion loss of the mechanical joining point at the end face of the ferrule of the field-installable connector. This may be done via the following steps: 1. Connect a pigtail to a suitable optical power emitter. 2. Insert and secure the non-terminated end of the pigtail into a field-installable connector. 3. Insert the same field-installable connector into an optical power meter. 4. Reference the received power level. 5. Disconnect the field-installable connector from the receiver port of the optical power meter. 6. Connect a short length, known good optical fiber jumper to the receiver port of the optical power meter. 7. Connect the other end of the same jumper to a known good connector adapter of the same type as the field-installable connector under test. 8. Connect the field-installable connector under test to the other side of the adapter. 9. Record the relative optical power loss (i.e., the change in optical power between step 8 and step 4). The relative optical power loss is the insertion loss due to the connector end face and should be added to the estimated insertion loss at the mechanical joining portion determined in the field measurement.

In order to estimate the insertion loss at a mechanical joining point during the process of terminating the field optical fiber with a field-installable connector, or estimating the insertion loss at any mechanical joining point (such as a mechanical splice or a mechanical coupling between opposing connectors), the mechanical joining portion is mounted within the apparatus shown in FIG. 1, as indicated by step 60 in the method of FIG. 2. In order to test the continuity of the stub optical fiber and the field optical fiber 36, the light source 22 is provided, such as a VFL, for producing the light energy having known characteristics, such as a predetermined intensity and/or wavelength. The light produced by the light source 22 is introduced into the stub optical fiber through the end face of the field-installable connector 28, as indicated by step 62 in FIG. 2. A reference optical power is measured and recorded prior to inserting the field optical fiber 36 into the connector 28 (or prior to performing the mechanical splice or mating the opposing connectors), as indicated by step 64 in FIG. 2.

While the light source 22 is introducing light energy into the stub optical fiber, the field optical fiber 36 is inserted into the rear end of the fiber optic connector 28 and advanced therethrough until physical contact is made with the stub optical fiber, as indicated by step 66 in FIG. 2. In the exemplary embodiment shown and described herein in which the field-installable connector 28 is a UniCam® mechanical splice connector, the end portion of the field optical fiber is inserted through the lead-in tube 34 and into a precision opening (e.g., V-groove) defined by splice components. While the end portion of the field optical fiber is spaced apart from the stub optical fiber, the light energy introduced into the stub optical fiber generates an enhanced glow that emanates from the end portion of the stub optical fiber within the splice components. Once the field optical fiber has made physical contact and is optically coupled with the corresponding stub optical fiber, either through direct physical contact or via an index matching gel disposed within the opening defined by the splice components, the intensity of the glow diminishes because the majority of the light energy is coupled into the field optical fiber 36. Light energy that is not transmitted into the field optical fiber 36 results in a residual glow that is significantly less than the enhanced glow present when the reference optical power is measured in step 64. In order to permit the glow to be more easily detected and collected by the light collecting means, a portion of the connector may be non-opaque. In the exemplary embodiment shown and described herein, at least one of the cam mechanism and the splice components of the UniCam® mechanical splice connector may be non-opaque.

Once physical contact is achieved and the light energy from the stub optical fiber is coupled to the field optical fiber, a terminated optical power is measured and recorded, as indicated by step 68 in FIG. 2. The terminated optical power is compared to the reference optical power to determine an estimate of the insertion loss at the mechanical joining point. When the magnitude of the terminated optical power, also referred to as the relative optical power (−dBr) as will be described further below, exceeds a predetermined minimum level, the termination is acceptable, as indicated by step 70 in FIG. 2. Step 66 and step 68 are repeated until the insertion loss is acceptable. In the case of the UniCam® mechanical splice connector, the cam mechanism 32 should then be actuated, as indicated by step 72 in FIG. 2. Once actuated, the insertion loss may again be estimated for verification that the termination remains acceptable, as indicated by step 74 in FIG. 2. If acceptable, the mechanical joining point may then be secured, completed or sealed (e.g., by a splice protector) as desired based on the components involved, as indicated by step 76 of FIG. 2. In the case in which the insertion loss is unacceptable, the cam mechanism 32 or mechanical connection may be deactivated, as indicated by step 78 in FIG. 2. In addition to repositioning and/or reinserting the field optical fiber 36, the field optical fiber may be withdrawn from the connector, re-cleaved and cleaned prior to being reinserted into the field-installable connector 28 and repositioned, as indicated by step 80 in FIG. 2. In this regard, the field optical fiber is generally cleaned of any index matching gel prior to being re-cleaved and thereafter cleaned with alcohol or the like. During the repositioning of the field optical fiber (step 66), the light energy continues to be introduced into the stub optical fiber and the insertion loss is again estimated.

The insertion loss across the mechanical joining point is estimated using the approximation provided by the calculations listed below. The relative (terminated) optical power (−dBr) displayed after completing the mechanical splice may be calculated as a percentage using the following equations:

$$-dBr = 10 \log_{10} x$$

Subtract x from 1

$$-dBr = 10 \log_{10} (1-x) \text{ (note: this is the mechanical splice insertion loss in } -dBr)$$

For example, if the reference optical power (−dBm) was measured at −20.0 dBm and the subsequent insertion loss (terminated optical power) measurement was −13 dBr, "x" would equal 5% of the power left, which means that approximately 95% of the optical power was coupled into the field optical fiber being terminated to the mechanical splice connector. Converting the ratio (1−x) to −dBr gives, an approximate mechanical splice insertion loss of −0.22 dBr.

The methods and apparatus of the present invention may further be used to provide an estimate of insertion loss at any mechanical joining point having a non-opaque pathway where light energy can be introduced and at least a useable portion of the light intensity, illumination or optical power can be collected and measured. In alternative embodiments not shown herein, methods and apparatus according to the present invention may provide an estimate of the insertion loss at a mechanical joining point using any radiant energy source (e.g., thermal, acoustic, etc.) and a corresponding means for collecting and measuring at least a useable portion of the radiant energy (e.g., heat energy, sound energy, etc.) at the mechanical joining point. Likewise, the methods and apparatus of the invention can utilize a conductive energy source (e.g., electrical, thermal) and a corresponding means for collecting and measuring at least a useable portion of the conductive energy at the mechanical joining point. In the example of using light energy and optical power shown and described herein, the mechanical joining point includes a non-opaque portion. For example, a connector including a translucent ferrule may be provided so that light energy introduced into an optical fiber strand produces a glow through the ferrule that is intentional, perceptible and consistent. The methods and apparatus for estimating insertion loss may be applied to any application in which optical fibers are mechanically joined or mated and one of the optical fibers is able to be energized with light energy from a source of optical power or light. Preferably, the ambient light is controlled and a means for detecting and/or collecting light is configured to consistently capture a sample of the light energy at the mechanical joining or mating point.

As previously described in limited detail above, the UniCam® family of connectors are ideal for applying the methods and apparatus of the present invention for estimating the insertion loss at the mechanical fiber joining point between the internal stub optical fiber and the field optical fiber. The UniCam® connector technology has unique design features that enable a rapid, accurate and cost effective insertion loss measurement of the mechanical joining point during the termination process and prior to crimping the lead-in tube to the tight-buffered material or tubing surrounding the field optical fiber. As stated above, the means for collecting light is used to measure a reference optical power and a terminated optical power, and an estimate of insertion loss can be calculated based on a percentage of the terminated optical power to the reference optical power. This insertion loss estimate reduces UniCam® scrap rates by eliminating reliance on the subjectivity of an operator to determine visually whether there has been sufficient reduction in the amount of "glow" emanating from the mechanical joining point to verify proper continuity between the stub optical fiber and the field optical fiber.

Figure 3:
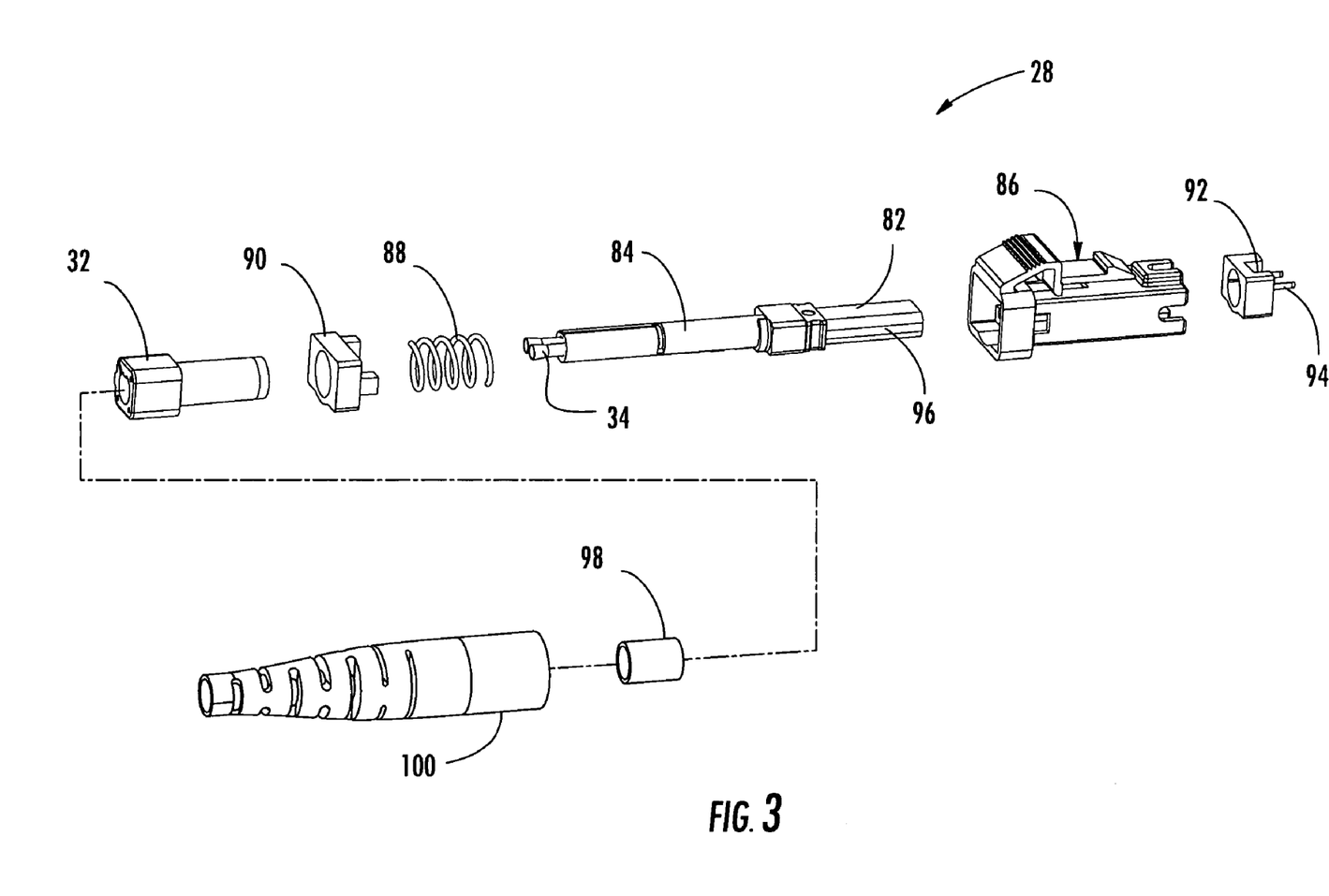
FIG. 3 is an exploded perspective view of a field-installable mechanical splice connector operable for terminating a field optical fiber, wherein the connector includes a non-opaque housing portion that allows light energy to be detected, collected and measured at the mechanical joining point while performing the method of FIG. 2.

Referring now to FIG. 3, by way of example only, a multi-fiber UniCam® mechanical splice connector 28 is shown. Although a multi-fiber connector is shown, it is envisioned that the connector may comprise one or more stub optical fibers for joining (i.e., mechanical splicing) with a corresponding one or more field optical fibers. The multi-fiber connector 28 shown in FIG. 3 comprises a multi-fiber ferrule 82 defining a plurality of optical fiber bores extending lengthwise at least partially through the ferrule. A plurality of stub optical fibers extend through and are secured within the optical fiber bores of the multi-fiber ferrule 82, for example with epoxy, in a known manner. Depending upon the ultimate use of the multi-fiber connector 28 and the type of optical fibers to which the stub optical fibers of the connector 28 will be mated, the stub optical fibers may be either multi-mode or single mode stub optical fibers. In any event, the optical fiber bores open through a front end face of the ferrule 82 and receive the stub optical fibers therein. While the multi-fiber ferrule 82 shown in FIG. 3 includes a pair of optical fiber bores, the multi-fiber ferrule 82 may include any number of bores depending upon the number of field optical fibers to which the fiber optic connector 28 is to be terminated.

Once the stub optical fibers are secured within the multi-fiber ferrule 82, the end face of the multi-fiber ferrule, including the ends of the stub optical fibers that are exposed via the optical fiber bores opening through the front face of the ferrule 82, is precision polished. Although the multi-fiber connector 28 is particularly well suited for installation in the field, the stub optical fibers are preferably secured within the multi-fiber ferrule 82 and the end face of the multi-fiber ferrule 82 and stub optical fibers are preferably polished in the factory. In addition, as stated above, an insertion loss measurement of the end face of the connector 28 is also determined in the factory. The other ends of the stub optical fibers extend rearwardly beyond the rear face of the multi-fiber ferrule 82. In this regard, the ends of the stub optical fibers that extend rearwardly beyond the rear face of the multi-fiber ferrule 82 have typically been precision cleaved in order to facilitate subsequent mechanical splicing to the corresponding field optical fibers.

The multi-fiber connector 28 also generally includes a ferrule holder 84 defining a lengthwise extending passageway for at least partially receiving the ferrule 82. For example, the second end of the ferrule is typically secured within one end of the passageway defined by the ferrule holder 84 by means of an epoxy or other adhesive, or by means of ultrasonic welding or the like. The multi-fiber connector 28 also includes one or more splice components (not shown) disposed within the passageway defined by the ferrule holder 84. The splice components are commonly formed of first and second splice portions or splice halves that are urged together to securely engage the ends of the stub optical fibers and the field optical fibers. In this regard, at least one of the splice components defines alignment openings (e.g. V-grooves) for receiving the ends of the stub optical fibers and the field optical fibers. Once assembled, the ferrule holder 84 secures the splice components within the lengthwise extending passageway such that insertion of the rear end of the multi-fiber ferrule 82 into the passageway correspondingly inserts the ends of the stub optical fibers that extend beyond the rear face of the multi-fiber ferrule 82 into respective grooves defined by the splice components.

The assembled components of the multi-fiber mechanical splice connector 28 are inserted into a connector housing 86. In certain embodiments, the connector 28 may include a spring 88 and a spring push member 90 that are disposed about the ferrule holder 82 and engage the interior of the connector housing 86 in order to resiliently bias the ferrule 82 forwardly in a longitudinal direction relative to the housing 86. In order to fabricate a male connector, the mechanical splice connector 28 may also include a pin keeper 92 that retains a pair of guide pins 94. During assembly, the forward end of the ferrule 82 can be extended through an opening defined by the pin keeper 92 prior to inserting the ferrule 82 and the ferrule holder 84 into the housing 86. As such, the guide pins 94 are positioned in respective guide pin passageways 96 defined by the ferrule 82 and extend beyond the front face of the connector housing 86 for mating with an opposing connector.

Once in the multi-fiber mechanical splice connector 28 is assembled and delivered to the field, the ends of the field optical fibers are inserted into the respective openings (e.g., V-grooves) from the opposite end of the splice components, so as to be aligned with and optically coupled with the corresponding stub optical fibers. For this purpose, the multi-fiber connector 28 also includes one or more lead-in tubes 34, also referred to and functioning as crimp tubes, through which the ends of the field optical fibers are introduced and guided into the respective openings defined by the splice components, thereby facilitating the insertion of the field optical fibers into the splice components and ensuring rough alignment of the field optical fibers with the corresponding stub optical fibers.

The ferrule holder 84 preferably defines a window (not shown) and at least one of the splice components preferably includes a keel (not shown). As such, the splice components can be disposed within the passageway defined by the ferrule holder 84 such that the keel is positioned within the window and is exposed through the window for facilitating actuation of the splice components. The multi-fiber connector 28 also includes a cam mechanism 32 that is mounted upon the ferrule holder 84. The cam mechanism 32 is designed to engage the keel of the splice component that is exposed through the window defined by the ferrule holder 84. In addition to engaging the exposed keel, the cam mechanism 32 is adapted to actuate the splice components, such as by urging the first and second portions of the splice components toward one another as the cam mechanism 32 is rotated relative to the ferrule holder 84 from a first non-activated position to a second activated position. Upon actuation of the splice components, the ends of the stub optical fibers and the ends of the field optical fibers are mechanically spliced and optically coupled (with or without an index matching gel therebetween).

Once the splice components have been actuated and the estimated insertion loss determined to be acceptable as described above, the lead-in tubes 34 are crimped about the field optical fibers and the remainder of the components of the multi-fiber connector 28 are assembled. For example, the connector 28 may include an annular crimp band 98 that is mounted over the lead-in tubes 34 and upon the end portion of the ferrule holder 84 proximate the cam mechanism 32. The crimp band 98 may also be deformed radially inward in order to engage strength members associated with the field optical fibers 36 that are positioned between the crimp band 98 and the ferrule holder 84. A flexible boot 100 that has that been previously positioned over the field optical fibers 36 may also be inserted into the rear end of the connector housing 86 so as to provide strain relief for the field optical fibers.

Figure 4:
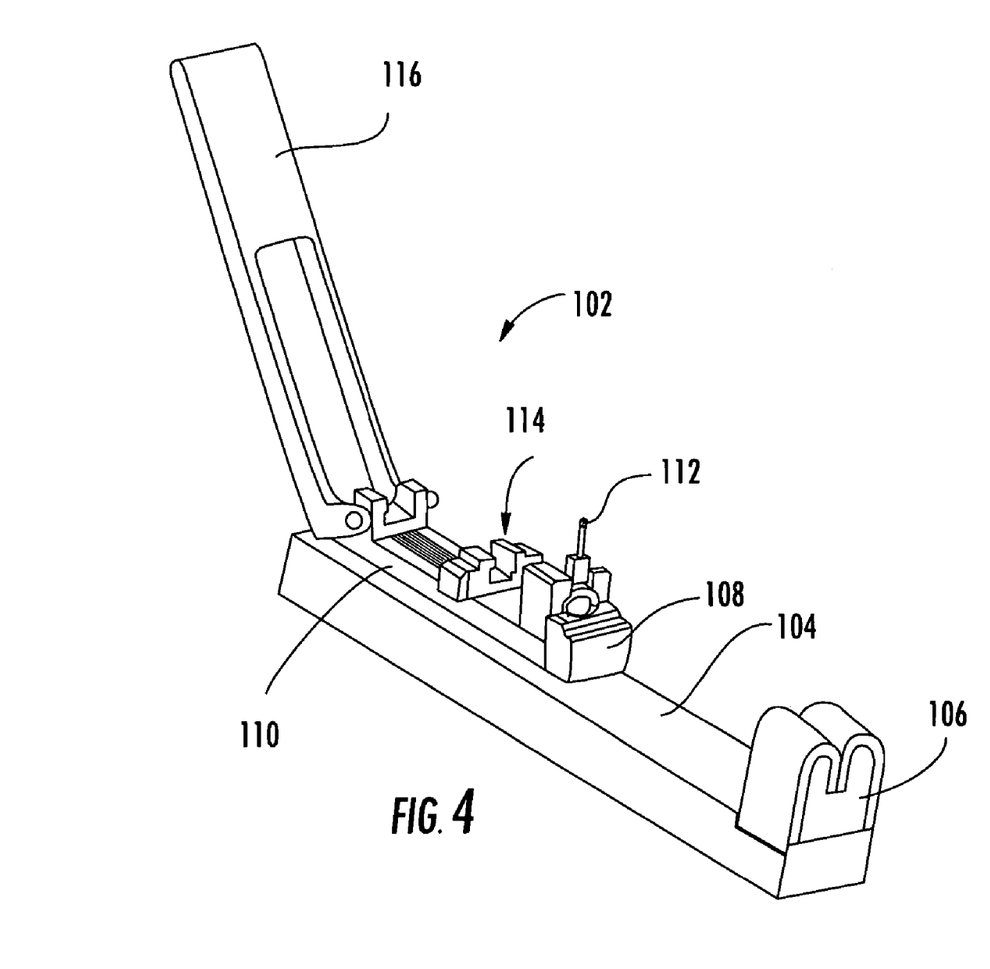
FIG. 4 is a perspective view of an installation tool for the field-installable connector of FIG. 3.
Figure 5:
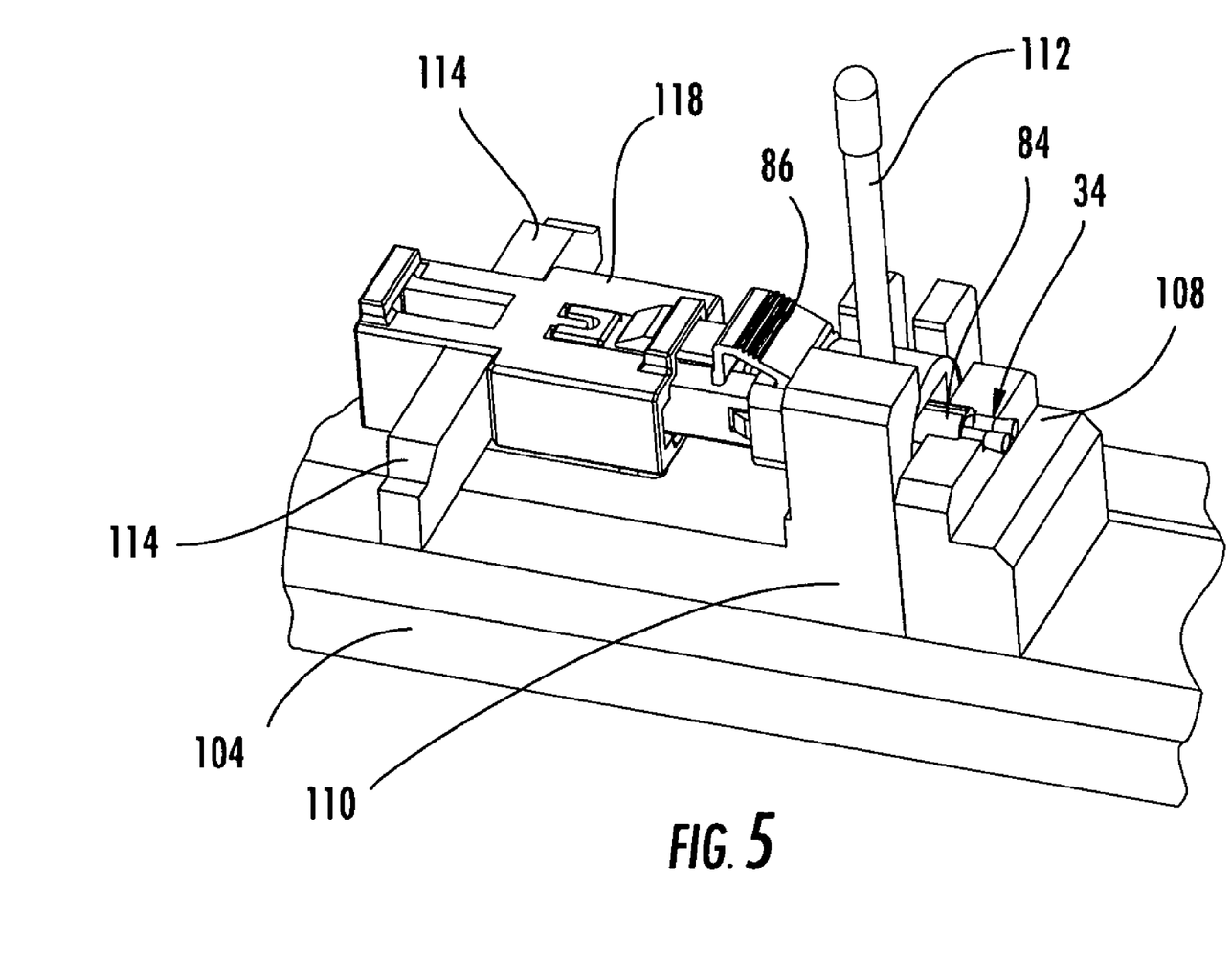
FIG. 5 is a perspective view of a portion of the installation tool of FIG. 4 having a portion of the field-installable connector of FIG. 3 mounted therein.

The methods and apparatus for estimating insertion loss of the field optical fibers and the stub optical fibers according to the present invention are particularly advantageous when the mechanical splice connector 28 is mounted upon the field optical fibers in the field. As such, referring to FIG. 4, an installation tool 102 is provided according to one embodiment of the present invention to facilitate mounting the field-installable connector 28 upon the ends of the field optical fibers 36. The installation tool typically includes a base 104. Mounted to the base 104 are a fiber holder 106 for retaining the field optical fibers 36, an anvil 108 for facilitating the crimping of the lead-in tubes 34 during final assembly of the connector 28, and a tool housing 110. The installation tool 102 also includes a wrench 112 mounted to the tool housing for engaging the cam mechanism 32 of the connector 28 and facilitating activation of the cam mechanism 32 to secure the ends of the stub optical fibers and the field optical fibers 36. The installation tool 102 further includes an engagement portion 114 of the tool housing 110, and an arm 116 pivotally attached to the tool housing. By rotating the arm 116 downwardly, the lead-in tubes 34 are compressed between the underside of the arm and the anvil 108, thereby crimping the lead-in tubes radially inward about the rear of the ferrule holder 84 and securing the cable jacket and/or strength members therebetween. The installation tool 102 permits insertion loss testing to be performed while the fiber optic connector 28 is mounted within the installation tool. An installation tool 102 having a connector 28 mounted therein within a test adapter 118 is shown in FIG. 5.

It will be apparent to those skilled in the art that various modifications and variations can be made to the present invention without departing from the spirit and scope of the invention. Thus, it is intended that the present invention cover all conceivable modifications and variations of this invention, provided those alternative embodiments come within the scope of the appended claims and their equivalents.

What is claimed is:

1. A method for estimating the insertion loss at a mechanical joining point between a stub optical fiber of a mechanical splice connector and a field optical fiber, comprising:
   introducing light energy into the stub optical fiber of the connector to produce a glow proximate the mechanical joining point;
   measuring a reference optical power of the glow proximate the mechanical joining point;
   introducing the field optical fiber into the mechanical splice connector such that at least a portion of the light energy from the stub optical fiber is coupled into the field optical fiber;
   measuring a terminated optical power of the glow proximate the mechanical joining point; and
   estimating the insertion loss at the mechanical joining point by comparing the terminated optical power to the reference optical power;
   wherein the stub optical fiber remains in a same position during the reference optical power measurement and the terminated optical power measurement; and
   wherein the light energy is visible through a translucent portion of the mechanical splice connector.

2. The method according to claim 1 further comprising combining a factory-determined end face insertion loss of the mechanical splice connector to the insertion loss at the mechanical joining point to determine a total insertion loss of the mechanical splice connector terminated to a field optical fiber.

3. The method according to claim 1 wherein the step of measuring the terminated optical power father comprises measuring the glow proximate the mechanical joining point as the field optical fiber is introduced into the mechanical splice connector.

4. The method according to claim 1 wherein no change in the measurement conditions occurs between the step of measuring the reference optical power and the step of measuring the terminated optical power other than the step of introducing the field optical fiber into the mechanical splice connector.

5. The method according to claim 1 further comprising shielding at least the mechanical joining point from ambient light surrounding the mechanical splice connector during the step of measuring the reference optical power and the step of measuring the terminated optical power so that the only difference between the reference optical power and the terminated optical power is a percentage of optical power tat is coupled from the stub optical fiber into the field optical fiber.

6. The method according to claim 1 wherein the step of measuring the reference optical power and the step of measuring the terminated optical power each further comprise collecting the light energy emanating from the stub optical fiber proximate the mechanical joining point.

7. The method according to claim 6 wherein collecting the light energy is accomplished using light collecting means comprising at least one optical fiber strand disposed about the mechanical joining point.

8. The method according to claim 7 wherein the at least one optical fiber strand comprises an array of plastic optical fibers (POF).

9. The method according to claim 8 wherein the array of plastic optical fibers (POF) is coupled through a passive 1×n optical coupler into a single optical fiber in optical communication with an optical power meter.

10. The method according to claim 6 wherein collecting the light energy is accomplished using light collecting means comprising a photodetector.

11. The method according to claim 6 wherein collecting the light energy is accomplished using light collecting means comprising an integrating sphere.

12. An apparatus for estimating insertion loss at a mechanical joining point between a field optical fiber and a stub optical fiber of a mechanical splice connector, comprising:
   a source of light operable for introducing light energy into the stub optical fiber;
   at least one optical fiber strand disposed about the mechanical joining point for collecting the light energy emanating from an end of the stub optical fiber proximate the mechanical joining point; and
   an optical power meter operatively coupled to the at least one optical fiber strand for measuring the optical power of the light energy emanating from the end of the stub optical fiber proximate the mechanical joining point;
   wherein the light energy is visible through a translucent portion of the mechanical splice connector.

13. The apparatus according to claim 12 wherein the at least one optical fiber strand comprises a plurality of plastic optical fibers (POF) disposed in a predetermined array about the mechanical joining point and optically coupled through a passive 1×n optical coupler into a single optical fiber in optical communication with the optical power meter.

* * * * *